United States Patent [19]

Eurom

[11] 4,102,445

[45] Jul. 25, 1978

[54] DOUBLE CABLE REEL

[76] Inventor: Fred Eurom, 1541 SW. 47th Ter., Ft. Lauderdale, Fla. 33317

[21] Appl. No.: 833,092

[22] Filed: Sep. 14, 1977

[51] Int. Cl.² .......................................... H02G 11/02
[52] U.S. Cl. ............................ 191/12.2 R; 242/158.3; 339/8 RL
[58] Field of Search ............................ 191/12.2, 12.4; 242/84.42, 158.3; 254/109 R; 339/5 R, 5 RL, 6 R, 6 RL, 8 R, 8 RL

[56] References Cited

U.S. PATENT DOCUMENTS

| 2,453,407 | 11/1948 | Burns | 191/12.2 R |
|---|---|---|---|
| 2,519,461 | 8/1950 | Hanson | 242/158.3 |
| 3,309,066 | 3/1967 | Carlson | 242/158.3 X |
| 3,590,171 | 6/1971 | Harrington | 191/12.2 R |

*Primary Examiner*—Stephen G. Kunin
*Attorney, Agent, or Firm*—Robert D. Farkas

[57] ABSTRACT

A double cable reel utilizes a cylindrical core and a pair of flanges affixed thereto. The reel, thus formed, is journaled to a cover plate and has two pair of wiper and contact washers arranged in concentric arrangement such that one pair is secured to the cover plate adjacent thereto. A cam drum is journaled so as to have its longitudinal axis aligned parallel to the longitudinal axis of the core and displaced radially outwardly therefrom. The cam drum is frictionally coupled to one of the flanges of the reel. Electrical contacts or terminals both of the stationary and the rotating variety are secured to the washers. The cam drum has a cam follower coupled into the double helical cam path located on the exterior surface thereof such that a double cable is wound up on the reel in a multi-layer helical path, such that one end of the cable is electrically connected to the pair of rotating terminals. Convenient mounting apparatus are provided for the apparatus whose major parts are easily disassembled facilitating cleaning and maintenance operations.

8 Claims, 3 Drawing Figures

DOUBLE CABLE REEL

BACKGROUND OF THE INVENTION

1. The Field of the Invention

This invention relates to reel storage devices and more particularly to that class suitable for storing a double conductor cable thereon.

2. Description of the Prior Art

The prior art abounds with devices which facilitate storage of elongated material such as hoses, electrical cables or wires thereon. U.S. Pat. No. 3,168,260 issued on Feb. 2, 1965 to A. L. Kittelson teaches a device rolling up canvas hose having an shaft about which the hose is disposed in either a single turn spiral fashion or a double layered spiral arrangement whereby the center portion of the hose is wrapped about the rotating axle of the apparatus. Manual rotation means couple the axle of the reel to a crank-line handle.

U.S. Pat. No. 3,474,985 issued on Oct. 28, 1969 to Ronald A. Brudi et al discloses two reels that are pivotally connected together and tensioned to rotate in opposite direction by a pancake-type coil spring between the reels, two hoses being wound in opposite directions on the two reels. The reel unit floats on the hose lines intermediate their ends and have no other support and no fluid connections with the hose lines.

Both of the aforementioned patents fail to disclose an apparatus which suitably stores a double electrical cable thereon such that one end of such cable is electrically coupled to a pair of stationary contacts suitable for use with heavy electrical conductors required in many operations, such as welding.

SUMMARY OF THE INVENTION

A primary object of the present invention is to provide a reel device which is suitable for storage of double conductor electrical cable.

Another object of the present invention is to provide a reel storage device which causes heavy electrical conductors, having at least a pair of conductors therein, disposed in solenoid-wound fashion forming a multi-layered solenoid whose distribution of turns in layers is carefully controlled economizing space thereby.

Still another object of the present invention is to provide an apparatus whose sliding electrical contacts are shielded from the weather yet easily accessed so as to facilitate cleaning and maintenance operations Yet another object of the present invention is to provide an apparatus of the type described which may be easily mounted to a supporting surface.

Another object of the present invention is to provide an apparatus wherein the cable distributing system may be disengaged from the storage reel portion so as to facilitate distributing the double conductor electrical cable in any desired starting or finishing pattern on the core portion of the storage reel.

Heretofore, storage reels have been described utilizing flange-type reels therefor. Such reels often are provided with devices which cause the elongated member to be stored upon the reel distributed along the surface of the core portion of the reel in an orderly fashion. Thus, multi-turn single layer helixes or multi-turn many layered solenoids of turns were utilized. However, none of the prior art devices were particularly adapted for outdoor use wherein a double conductor heavy cable was provided for. Furthermore, the prior art apparatus fail to provide an electrical contacting assembly which facilitated bringing electrical energy provided by an outside generating source, to the end of the electrical cable stored on the storage reel. The present invention contemplates these problems and solves them utilizing two pair of concentrically aligned conducting washers, one pair of which serve as a brush assembly whilst the other pair of which serves as a slip ring assembly. The double cable conductor is distributed onto the surface of a storage reel utilizing a cam follower engaged within a cam surface of a cam drum. By having the cam drum frictionally driven from the flanges of the storage reel the cam drum may be caused to have its rotation ability altered relative to that of the reel, thereby enabling a user to store such heavy double electrical connectors within the cable reel without having a free end of the cable rotating as the reel rotates thereby creating a connection problem from a stationary source of electrical energy.

These objects as well as other object of the present invention will become more readily apparent after reading the following description of the accompanying drawings.

DESCRIPTION OF THE PREFERRED EMBODIMENT

The structure and method of fabrication of the present invention is applicable to a storage reel having a cylindrical core and a pair of radial flanges secured to the ends thereof. One of the flanges is provided with an outwardly extending member having a rubber-like O-ring affixed thereto. The outer lateral surface of this flange member is provided with a pair of coaxially aligned washer-like metallic members secured thereto. A pair of electrical terminals reside within the cavity formed between this flange and the core and electrically contact the pair of washers secured to the flange. A cover plate is provided such that the cover plate resides substantially parallel to the flange carrying the pair of conducting washers. The adjacent surface of the cover plate to the washers also carries a pair of electrically conducting washers that are juxtaposed to the washers covered by the flange and are caused to reside in touching engagement therewith by virtue of a spring disposed about an axle coupling the cover plate to the flange. The axle is utilized as a bearing support for the reel. Another pair of terminals pass through the cover plate and electrically engage the stationary pair of electrical washers. Thus, as the wheel rotates about its axle the stationary pair of electrical conductors engage the rotating pair of electrical conductors electrically. A cam drum, having a cylindrical shape, is journaled about a drum axle having a longitudinal axle disposed parallel to the longitudinal axis of the core but outwardly therefrom. The cam drum is cause to rotate by having a portion of its surface frictionally engage the O-ring. The surface of the cam drum is provided with a double wound helical track in which one end of a cam follower rod is slidably engaged. The other end of the cam follower rod is provided with a block having an opening therethrough. A double cable is cause to be stored upon the core of the reel having one end thereof electrically connected to each of the rotating terminals. A portion of the cable passes through the opening in the block. Thus, when the reel rotates, the cable is caused to lay-up or unwind from the surface of the core in a multi-layered solenoid type path as the cam follower rod reciprocates from side to side between the flanges of the reel. The axle, about which the cam cylinder is journaled, is removably secured to a cylinder secured to the outermost surface of the stationary cover plate. There is an annular groove formed in such device facilitating mounting thereof utilizing a double vertically disposed fork arrangement. The cover plate is caused to be urged towards the flange carrying the washers by a helical spring wrapped about the axle of the reel so as to urge the reel and cover plate towards each other.

Figure 1:
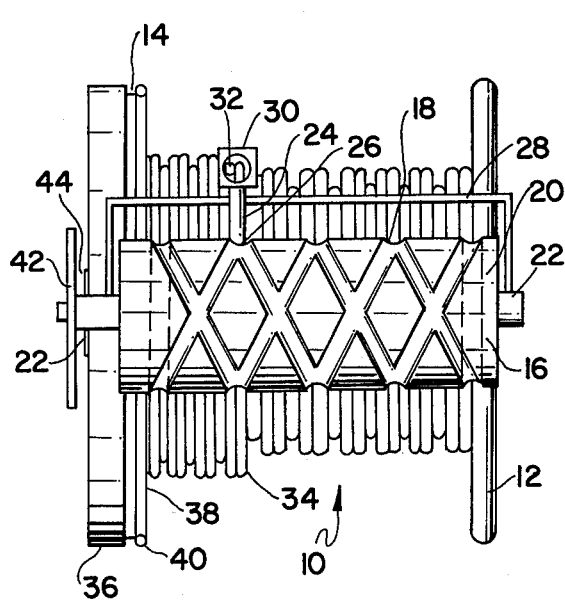
FIG. 1 is a side elevational view of the present invention.

Now referring to the figures, and more particularly to the embodiment illustrated in FIG. 1 showing the present invention 10 including a flange 12 and a flange 14. Cam cylinder 16 is shown having a double wound helical groove 18 in surface 20 thereof. Axle 22 is utilized to provide support for cylinder 16. Cam follower rod 24 is shown having end 26 thereof engaged within groove 18. Support rod 28 is utilized to provide support for cam follower rod 24. Block 30 is shown mounted to one end of cam follower rod 24 through which a portion 32 of double conducting cable 34 passes. Cover plate 36 is shown residing adjacent flange member 14 which has disc 38 affixed thereto. A rubber-like O-ring 40 is shown attached to the peripheral edge of disc 38. Block 42 is shown provided having annular groove 44 located therein.

Figure 2:
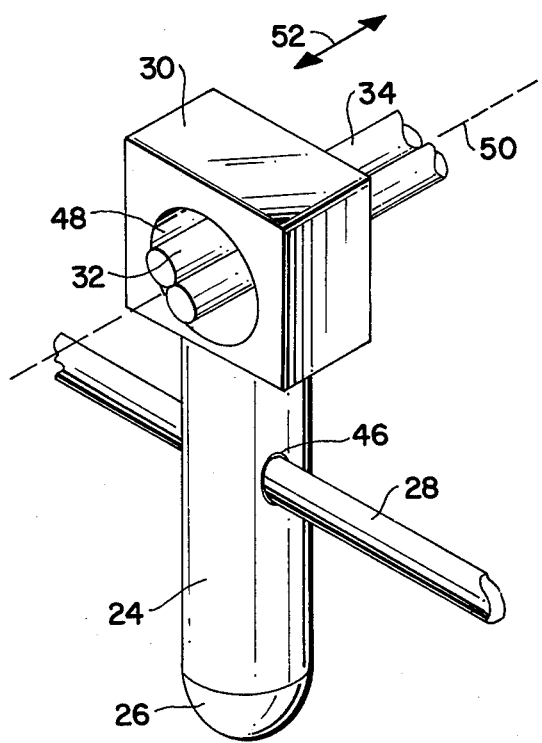
FIG. 2 is a perspective view of a portion of the present invention.

FIG. 2 illustrates cam following rod 24 having end 26 disposed in a blunted semi-spherical-like end adapted to engage within groove 18 shown in FIG. 1. Support rod 28 is shown passing through opening 46 in cam following rod 24. Block 30 is shown having opening 48 through which portion 32 of cable 34 pass. If desired, hole 48 may be disposed having a shape comlimentary to the exterior surface of cable 34 thereby preventing cable 34 from turning about the longitudinal axis thereof depicted by dotted line 50, as cable 34 moves in the direction of arrows 52.

Figure 3:
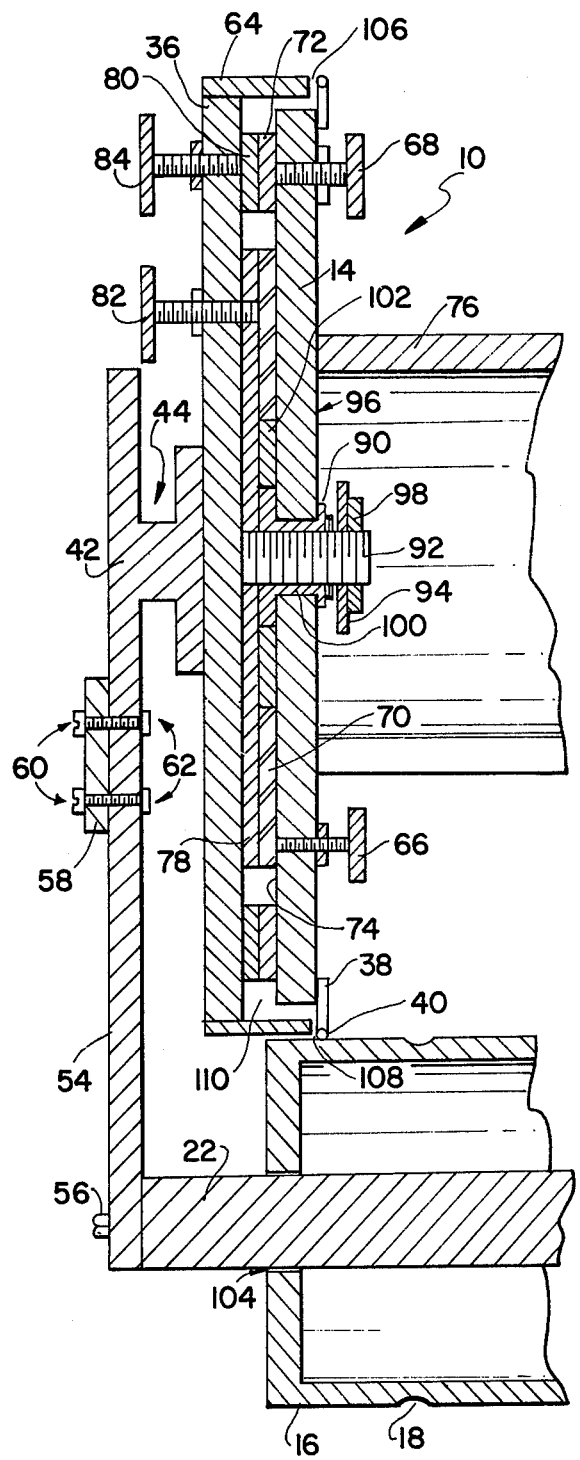
FIG. 3 is a cross-sectional plan view of the apparatus shown in FIG. 1.

FIG. 3 illustrates shaft 22 being disposed secured to arm 54 utilizing bolt 56 to fasten them together. Cylindrical drum 16 is shown engaging O-ring 40 on a portion of the exterior surface thereof. Arm 54 is shown fastened to block 42 utilizing joining plate 58 therefor. Bolts 60 and nuts 62 fasten joining plate 58 and arm 54 to block 42. Annular groove 44 is shown in the surface of block 42 which is useful for mounting the apparatus. Cover plate 36 is shown having skirts 64 fastened thereto which shields flange 14 from the weather. Terminal 66 and 68 are electrically coupled to electrically conducting washers 70 and 72. Washer 70 and 72 are secured to lateral surface 74 of flange 14. Core 76 is disposed secured to flange 14 having a common longitudinal axis. Electrically conducted washers 78 and 80 are disposed touching washers 72 and 70 respectively. Terminals 82 and 84 electrically contact washers 78 and 80. Thus, terminals 82 and 84 are maintained in a stationary position while terminals 66 and 68 are free to rotate whilst core 76 and flange 14 rotate therewith. Excellent electrical contact is maintained between terminals 82 and 86 as well as terminal 84 and 68 by virtue of helical spring 90 disposed wrapped about threaded rod 92. Helical spring 90 causes a force to be exerted on washer 94 in an opposite direction to the force similarly exerted on surface 96 of flange 14. Nut 98 is used to adjust the compression of helical spring 90. Cup shape washer 100, preferably fabricated from an insulating material, permits flange 14 to journal about axle 92 easily. Filler washer 102 is disposed between flange 14 and washer 78 and is also preferably fabricated from an insulating material as is flange 14 and cover plate 36. Cam cylinder 16 is shown journaled about axle 22 by having axle 22 pass through opening 104 located in cam cylinder 16. Skirt 64 may be fabricated from an insulating material or if desired, a metallic material. End 106 of skirt 64 is disposed residing adjacent to washer-like member 38 which carries O-ring 40. Thus, opening 108 is minimized representing the only way in which water or other elements of the weather may enter the cavity 110 in which washers 74, 70, 78, 80 and 102 reside. This minimizes the collection of dirt and increased life span of the metallic material comprising the metallic washers.

One of the advantages of the present invention is to provide a reel device which is suitable for storage of double conductor electrical cable.

Another advantage of the present invention is to provide a reel storage device which causes heavy electrical conductors, having at least a pair of conductors therein, disposed in solenoid-wound fashion forming a multi-layered solenoid whose distribution of turns in layers is carefully controlled economizing space thereby.

Still another advantage of the present invention is to provide an apparatus whose sliding electrical contacts are shielded from the weather yet easily accessed so as to facilitate cleaning and maintenance operations.

Yet another advantage of the present invention is to provide an apparatus of the type described which may be easily mounted to a supporting surface.

Another object of the present invention is to provide an apparatus wherein the cable distributing system may be disengaged from the storage reel portion so as to facilitate distributing the double conductor electrical cable in any desired starting or finishing pattern on the core portion of the storage reel.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A double reel cable comprises a reel including a pair of flanges and a cylindrical core, one of said pair of flanges having a first pair of metallic washers fixedly secured to a lateral surface thereof, said first pair of metallic washers being disposed in concentric relationship, a cover plate, a second pair of metallic washers, said cover plate being disposed in parallel spaced apart relationship with said one of said pair of flanges, said second pair of washers being disposed fixedly secured to a lateral surface of said cover plate located adjacent to said one flange of said pair of flanges, said first pair of washers and said second pair of washers being disposed in juxtaposed touching electrical engagement, said reel being journaled to said cover plate about an axle rod, said axle rod being disposed coaxially aligned with first said pair of washers, a first pair of electrical terminals, said first pair of electrical terminals electrically coupled to said first pair of washers, said first pair of electrical terminals being disposed fixedly secured to said one flange of said pair of flanges, a second pair of electrical terminals, said second pair of electrical terminals, said second pair of electrical terminals being electrically coupled to said second pair of washers, said second pair of electrical terminals being disposed fixedly secured to said cover plate, said one flange of said pair of flanges and said cover plate are being nonelectrically conducting, a cylindrical drum, said cylindrical drum journaled about an axle having a longitudinal axis coaxially aligned with the longitudinal axis of the cylindrical surface of the said cylindrical drum, said longitudinal axis of said cylindrical drum being disposed parallel to said longitudinal axis of said first pair of washers, a portion of the surface of a rubber-like O-ring being disposed in touching frictional engagement with a portion of said surface of said cylindrical drum, a double-wound helical groove being located in said surface of said cylindrical drum, a cam follower rod, one end of said cam follower rod being configured so as to be complimentary shaped with said double-wound helical groove and residing thereinto, a generally U-shaped rod, said cam follower rod having an opening therein, said generally U-shaped rod being disposed secured to said axle about which said cylindrical drum is journaled, an arm, one end of said arm secured to said axle carrying said cylindrical drum, the other end of said arm being disposed removably secured to a block, said block being disposed secured to an outermost lateral surface of said cover plate, an annular groove being located in said block, said annular groove being disposed concentrically aligned with said longitudinal axis of said first pair of annular washers.

2. The apparatus as claimed in claim 1 further comprising another block, said another block being disposed fixedly secured to the other end of same cam follower rod, said another block having a hole therein.

3. The apparatus as claimed in claim 2 further comprising a double conductor electrical cable, one end of said electrical cable having the individual conductors thereof electrically coupled to said rotationable terminal, a portion of said electrical cable being wound about said core of said reel.

4. The apparatus as claimed in claim 3 wherein another portion of said electrical cable passes through said hole in said another block.

5. The apparatus as claimed in claim 1 further comprises a skirt, said skirt having a generally cylindrical shape, a portion of the interior surface of said skirt being disposed fixedly secured to a marginal edge of said cover plate.

6. The apparatus as claimed in claim 1 further comprising bias means for urging together opposed lateral surfaces of said one flange of said pair of flanges and said cover plate.

7. The apparatus as claimed in claim 1 wherein said one end of said cam follower rod is disposed having a semi-spherical shape.

8. The apparatus as claimed in claim 1 wherein the length of said double wound helical groove is substantially equal to the drum separating each of said pair of flanges.

* * * * *